(12) United States Patent
Frazier et al.

(10) Patent No.: US 8,695,010 B2
(45) Date of Patent: Apr. 8, 2014

(54) PRIVILEGE LEVEL AWARE PROCESSOR HARDWARE RESOURCE MANAGEMENT FACILITY

(75) Inventors: Giles R. Frazier, Austin, TX (US); Michael K. Gschwind, Chappaqua, NY (US); Naresh Nayar, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 13/251,879

(22) Filed: Oct. 3, 2011

(65) Prior Publication Data

US 2013/0086581 A1 Apr. 4, 2013

(51) Int. Cl.
*G06F 9/46* (2006.01)

(52) U.S. Cl.
USPC .............................. 718/104; 718/102; 712/31

(58) Field of Classification Search
USPC ..................................... 718/104, 100; 712/31
See application file for complete search history.

(56) References Cited

U.S. PATENT DOCUMENTS

| | | | |
|---|---|---|---|
| 5,414,851 A | 5/1995 | Brice, Jr. et al. | |
| 5,481,719 A | 1/1996 | Ackerman et al. | |
| 5,606,696 A | 2/1997 | Ackerman et al. | |
| 6,976,155 B2 | 12/2005 | Drysdale et al. | |
| 7,093,106 B2 | 8/2006 | Ambekar et al. | |
| 7,155,600 B2 | 12/2006 | Burky et al. | |
| 7,216,223 B2 | 5/2007 | Michaelis | |
| 7,487,505 B2 | 2/2009 | Rosenbluth et al. | |
| 7,685,635 B2 | 3/2010 | Vega et al. | |
| 7,694,304 B2 * | 4/2010 | Kissell | 718/104 |
| 7,725,559 B2 | 5/2010 | Landis et al. | |
| 7,757,231 B2 | 7/2010 | Anderson et al. | |
| 2005/0182788 A1 | 8/2005 | Arndt et al. | |
| 2006/0004988 A1 | 1/2006 | Jordan | |
| 2006/0236094 A1 * | 10/2006 | Leung et al. | 713/152 |
| 2006/0294238 A1 | 12/2006 | Nalk et al. | |
| 2007/0028238 A1 | 2/2007 | Bennett et al. | |
| 2007/0050764 A1 | 3/2007 | Traut | |
| 2008/0046621 A1 | 2/2008 | Okino et al. | |
| 2008/0301700 A1 | 12/2008 | Junkins et al. | |
| 2009/0013329 A1 | 1/2009 | May et al. | |

(Continued)

OTHER PUBLICATIONS

Parameswaran et al., Virtualization in System p, IBM, Nov. 2007, 12 pages.*

(Continued)

*Primary Examiner* — Diem Cao
(74) *Attorney, Agent, or Firm* — Mitch Harris, Atty at Law, LLC; Andrew M. Harris; Matthew W. Baca

(57) ABSTRACT

Multiple machine state registers are included in a processor core to permit distinction between use of hardware facilities by applications, supervisory threads and the hypervisor. All facilities are initially disabled by the hypervisor when a partition is initialized. When any access is made to a disabled facility, the hypervisor receives an indication of which facility was accessed and sets a corresponding hardware flag in the hypervisor's machine state register. When an application attempts to access a disabled facility, the supervisor managing the operating system image receives an indication of which facility was accessed and sets a corresponding hardware flag in the supervisor's machine state register. The multiple register implementation permits the supervisor to determine whether particular hardware facilities need to have their state saved when an application context swap occurs and the hypervisor can determine which hardware facilities need to have their state saved when a partition swap occurs.

15 Claims, 5 Drawing Sheets

(56) References Cited

U.S. PATENT DOCUMENTS

| | | |
|---|---|---|
| 2009/0100249 A1 | 4/2009 | Eichenberger et al. |
| 2009/0144737 A1 | 6/2009 | Armstrong et al. |
| 2009/0182989 A1 | 7/2009 | Rosenbluth et al. |

OTHER PUBLICATIONS

Park, II; "Implicitly-Multithreaded Processors", Doctor of Philosophy Thesis, Purdue University, Aug. 2003.

Andrew, et al.; "hthreads: A Hardware/Software Co-Designed Multithreaded RTOS Kernel", IEEE Conference on, vol. 2, Sep. 19-22, 2005, pp. 330-338.

Yen-Kuang, et al.; "The Impact of SMT/SMP Designs on Multimedia Software Engineering—A Workload Analysis Study", IEEE Proceedings, Dec. 11-13, 2002.

Alastruey, et al.; "Selection of The Register File Size and The Resource Allocation Policy on SMT Processors", IEEE Inter. Oct. 29-Nov. 1, 2008, pp. 63-70.

\* cited by examiner

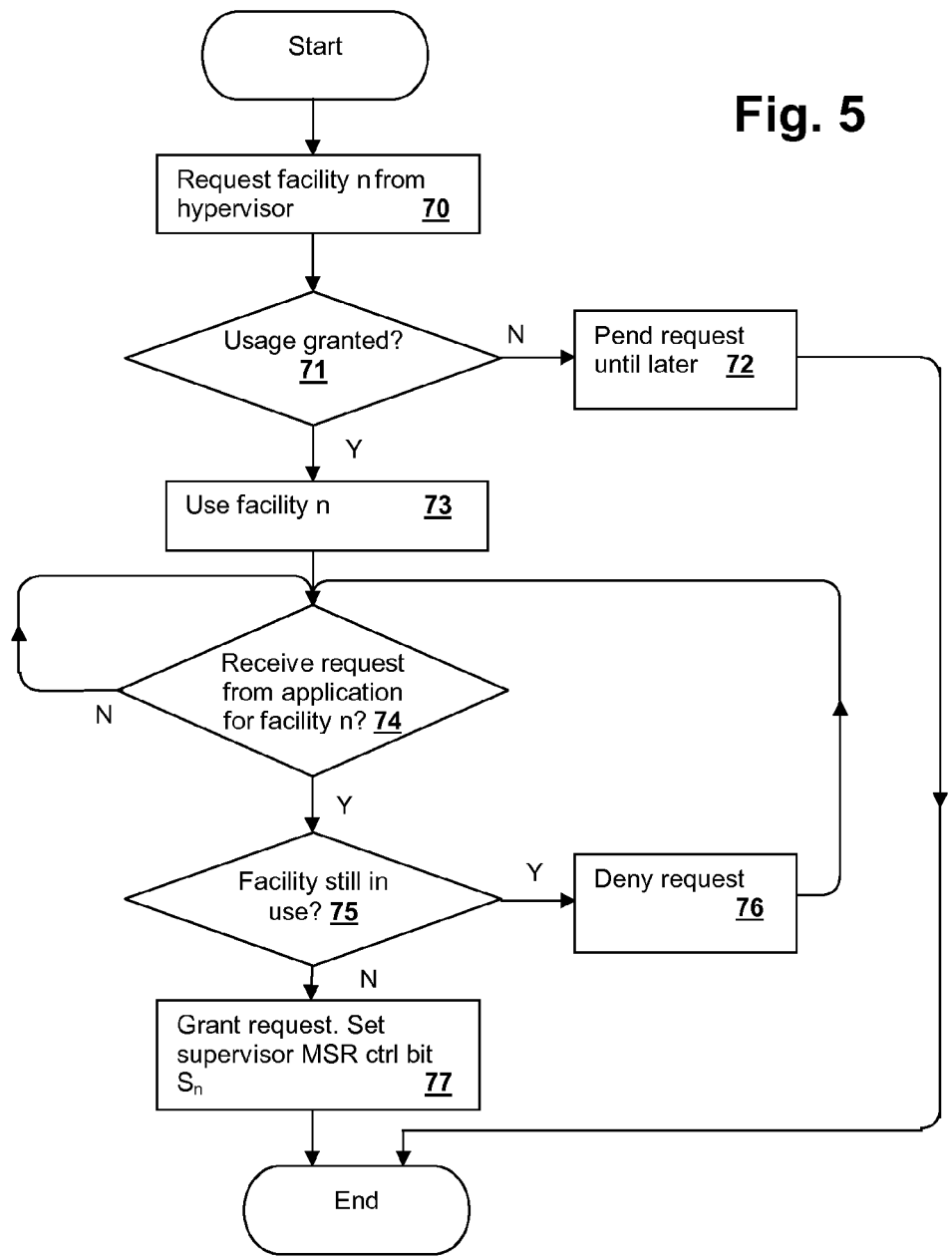

PRIVILEGE LEVEL AWARE PROCESSOR HARDWARE RESOURCE MANAGEMENT FACILITY

BACKGROUND OF THE INVENTION

1. Field of the Invention

The present invention is related to processing systems and processors, and more specifically to techniques for tracking use of hardware resources by lower privilege level processes.

2. Description of Related Art

In present-day processors, large numbers of hardware resources (or facilities) are available in each processing unit and multiple privilege levels and/or levels of virtualization are typically present during execution of programs in present-day systems. The hardware facilities within the processors are typically managed at the highest privilege level, which in multi-level virtualized systems is generally controlled by a hypervisor that manages availability and allocation of the hardware resources, such as processing units, to one or more operating systems images. In multi-level managed systems, supervisors, which are operating systems processes that schedule and manage the execution of applications, as well as managing operating systems internals, control the execution of applications by those operating systems images and are executed at a privilege level between that of the hypervisor and the applications.

In existing systems, application hardware facility usage is tracked by the supervisor so that when a context swap occurs within a partition, the supervisor can avoid some of the overhead associated with the context swap by saving/restoring only the states of the facilities that are used. However, in a multi-level managed system as described above, in order for the hypervisor to manage a partition context swap, the hypervisor must find out whether the supervisor(s) has registered use of a facility, and independent whether or not the facility has actually been used, the state of the facility must be saved and restored. Additionally, in order to avoid "covert channels", in which an application or partition can obtain information from residual information remaining in the facility from a previous process, the state of the facility must always be restored or be written with an initializing state that replaces the contents of the facility's storage. Existing systems also lack discrete management for allocation of the hardware facilities as among the applications, the supervisor and the hypervisor.

It would therefore be desirable to provide a processor having more discrete management of hardware facilities as among the applications, the supervisor and the hypervisor.

BRIEF SUMMARY OF THE INVENTION

The invention is embodied in a processor core and a computer system that provide hardware facility usage status and control registers, that in conjunction with signals indicating that the status register has changed, allow a hypervisor and/or supervisor layer to determine hardware facility usage by a next lower layer, both for reducing context swap overhead, for facility allocation management and for process security.

A processor core of the computer system tracks use of a hardware execution facility within the processor core by processes executing at different privilege levels. A process, such as a hypervisor, at a first higher privilege level maintains a first hardware flag in a first register of the processor core that enables access to a corresponding particular hardware facility by another lower privilege level. Another process at a second privilege level lower than the first privilege level, such as a supervisor thread of an operating system image, maintains a second hardware flag in a second register of the processor core that enables access to the corresponding particular hardware facility at a third privilege level lower than the second privilege level. In one embodiment of the invention, all of the facilities are initially disabled. In particular embodiments of the invention, when a process at either the second or third privilege level attempts to access a disabled facility, the hypervisor receives an indication and determines whether to enable the facility by setting the corresponding flag in the first register. If the facility is disabled at the time of a partition swap, the hypervisor can avoid saving the facility state in the partition context. When a process at the third privilege level attempts to access a disabled facility, the supervisor also receives an indication that the facility has been accessed, and can determine whether to enable the facility by setting the corresponding flag in the second register. If the facility is still disabled at time of a context swap, then the state of the facility need not be saved in the context. When a process at the third privilege level accesses the facility, the hypervisor generally receives an indication prior to the supervisor receiving an indication. However, the order could be reversed and the supervisor could receive the indication first, providing a mechanism for preventing enabling the facility by the hypervisor in response to an application's access, unless the supervisor authorizes the access first.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

FIG. 5 is a flowchart depicting a method of tracking hardware facility usage in accordance with an embodiment of the present invention.

DETAILED DESCRIPTION OF THE INVENTION

The present invention relates to processors and processing systems in which use of hardware facilities within processor cores are tracked at multiple privilege levels, by using multiple machine state registers that contain flags indicating the in-use condition for corresponding hardware facilities (hardware resources), such as floating point units and other devices internal to the processor cores. The in-use condition is tracked by disabling all hardware facilities at initialization, then setting individual flags that enable the corresponding hardware facilities as they are accessed. The flags are set in registers corresponding to the privilege level at which the access occurred. By providing a ready indication of which facilities are in use and discriminating by privilege level, at a context swap, a hypervisor swapping out a partition, or a supervisor (operating system scheduler) swapping out an application, can reduce the overhead time associated with storing hardware facility states if the hardware facility has not yet been used at the time the context swap occurs. Further, upon initialization of a partition or application execution space, the hypervisor or supervisor can determine whether a residual state present in the facility needs to be cleared (or "wiped"), in order to prevent a covert channel through which another partition or application can obtain information left there by another partition or application. Finally, providing separate machine state registers for the hypervisor and supervisor privilege levels permits managing access to resources among processes at higher and lower levels of privilege, since if only a single in-use flag is provided in the processor core and the facility has been enabled by the hypervisor or supervisor, a supervisor cannot then disable the facility to block access by an application without also blocking access to the facility by the hypervisor. By providing multiple levels of in-use information, the supervisor can determine whether to enable a facility for use by an application, even if the in-use flag is set in the hypervisor machine state register, since the corresponding flag in the supervisor machine state register can still be set to the disabled state.

Figure 1:
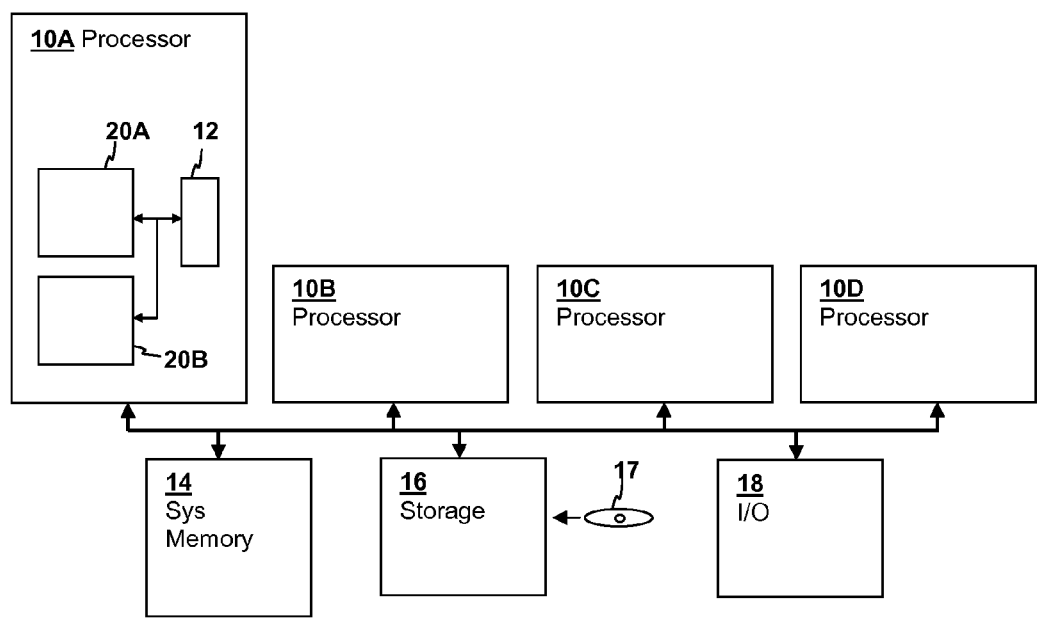
FIG. 1 is a block diagram illustrating a processing system in which techniques according to an embodiment of the present invention are practiced.

Referring now to FIG. 1, a processing system in accordance with an embodiment of the present invention is shown. The depicted processing system includes a number of processors 10A-10D, each in conformity with an embodiment of the present invention. The depicted multi-processing system is illustrative, and processing system in accordance with other embodiments of the present invention include uni-processor systems having symmetric multi-threading (SMT) cores. Processors 10A-10D are identical in structure and include cores 20A-20B and local storage 12, which may be a cache level, or a level of internal system memory. Processors 10A-10B are coupled to main system memory 14, a storage subsystem 16, which includes non-removable drives and optical drives, for reading media such as a CD-ROM 17 forming a computer program product and containing program instructions implementing a hypervisor for controlling multiple logical partitions (LPAR) for execution by processors 10A-10D, and also operating systems each of which has at least one supervisory thread for managing the operating system scheduler and other services, and also containing executable programs that implement applications and services executing within the logical partitions. The illustrated processing system also includes input/output (I/O) interfaces and devices 18 such as mice and keyboards for receiving user input and graphical displays for displaying information. While the system of FIG. 1 is used to provide an illustration of a system in which the processor architecture of the present invention is implemented, it is understood that the depicted architecture is not limiting and is intended to provide an example of a suitable computer system in which the techniques of the present invention are applied.

Figure 2:
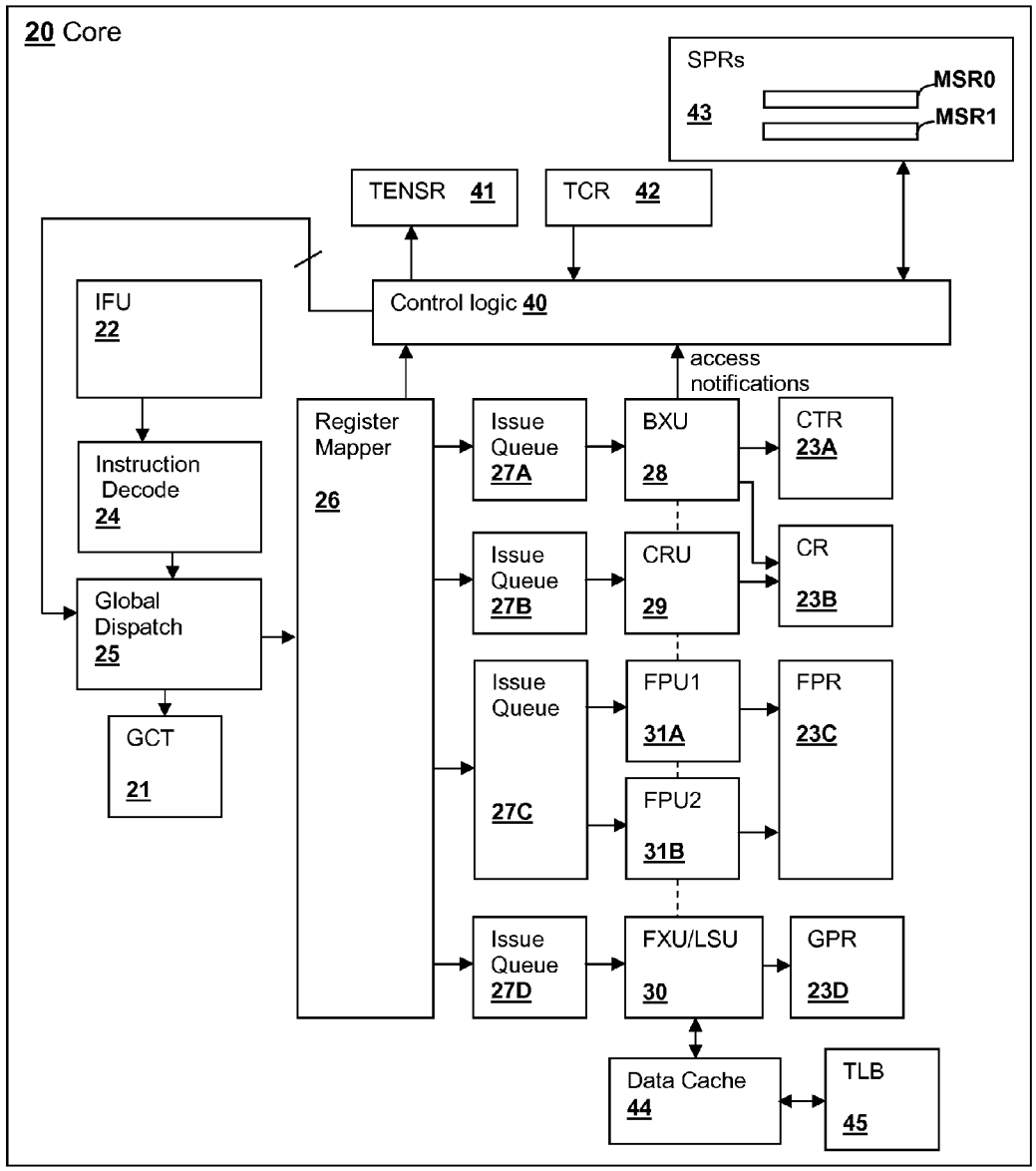
FIG. 2 is a block diagram illustrating details of a processor core 20 in accordance with an embodiment of the present invention.

Referring now to FIG. 2, details of processor cores 20A-20B of FIG. 1 are illustrated in depicted core 20. Core 20 includes an instruction fetch unit (IFU) 22 that fetches one or more instruction streams from cache or system memory and presents the instruction stream(s) to an instruction decode unit 24. A global dispatch unit 25 dispatches the decoded instructions to a number of internal processor pipelines. The processor pipelines each include a register mapper 26, one of issue queues 27A-27D, and an execution unit provided by branch execution unit (BXU) 28, condition result unit (CRU) 29, fixed-point unit load-store unit (FXU/LSU) 30 or floating point units (FPUs) 31A-31B. Registers such as counter register (CTR) 23A, condition register (CR) 23B general-purpose registers (GPR) 23D, and floating-point result registers (FPR) 23C provide locations for results of operations performed by the corresponding execution unit(s). Special purpose registers (SPRs) 43 provide support for hypervisor status and control, including multiple machine status registers that operate as will be described herein according to techniques of the present invention. A global completion table (GCT) 21 provides an indication of pending operations that is marked as completed when the results of an instruction are transferred to the corresponding one of result registers 23A-23D. Register mappers 26 allocate storage in the various register sets so that concurrent execution of program code can be supported by the various pipelines. FXU/LSU 30 is coupled to a data cache 44 that provides for loading and storing of data values in memory that are needed or modified by the pipelines in core 20. Data cache 44 is coupled to one or more translation look-aside buffers (TLB) 45 that map real or virtual addresses in data cache 44 to addresses in an external memory space. A thread enable status register (TENSR) 41 is provided that indicates the status of threads. A thread control register (TCR) 42 is provided for the hypervisor to control the enabled/disabled state of individual hardware threads.

Figure 3:
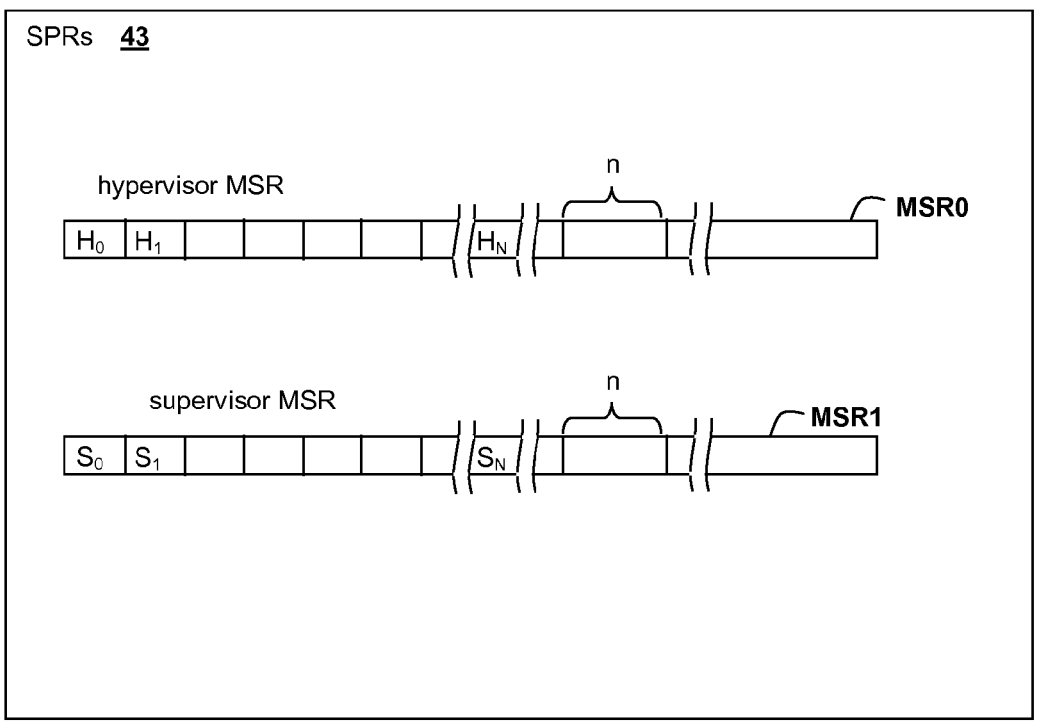
FIG. 3 is a block diagram illustrating details of hardware facility usage monitor 46 within processor core 20 of FIG. 2, in accordance with an embodiment of the present invention.

In illustrated core 20, a pair of machine status registers (MSRs) MSR0 and MSR1 within SPRs 43 provide separate control of the enabled/disabled status of the individual hardware facilities managed by the present invention. In particular embodiments of the invention MSRs MSR0 and MSR1 also give an indication, in conjunction with an interrupt, of which hardware facility has been accessed when an access occurs to a disabled hardware facility. The separate MSRs are associated with different privilege levels within software executed by core 20, for example MSR MSR0 may be managed by and inform the hypervisor level, while MSR MSR1 may be managed by and inform the supervisor level. While the hypervisor could manage MSR MSR1, it is advantageous to have the supervisor manage MSR MSR1, since the supervisor can readily determine whether or not to grant access to a particular application. Referring additionally to FIG. 3, a meaning of bits within MSRs MSR0 and MSR1 is shown. A read or write to MSR MSR0 contains flag bits $H_0$-$H_N$, each of which corresponds to a particular hardware facility within core 20, such as FPU 31A or FPU 31B, and for the purposes of illustration, a logical "1" bit represents an enabled facility and a logical "0" bit represents a disabled facility. Flags could also be used to represent usage of external hardware facilities, as well, although signaling of an access attempt would have to be provided via a mechanism other than an internal hardware interrupt connection, as will be illustrated for internal facility accesses in further detail below. A write to MSR MSR0 sets or clears individual bits $H_0$-$H_N$, which control the enabled/disabled state of the particular hardware facilities corresponding to the individual bits. For the purposes of illustration, a write of a "1" to one of bits $H_0$-$H_N$ enables access to the corresponding hardware facility and a write of a "0" to that bit disables access to the particular hardware facility. It is understood that enabled and disabled in the context of the present invention does not necessarily indicate that the facility itself will be enabled or disabled, e.g., have power supply voltage removed or be otherwise logically inaccessible, although such power management or control could be used in conjunction with the techniques of the present invention. In particular, when a process executing below the hypervisor privilege level, e.g., an operating system partition's supervisor or an application managed by the supervisor, attempts to access a hardware facility that is disabled, embodiments of the present invention signal control logic 40 within core 20 that an access has been made to a hardware facility n, when corresponding bit $H_n$ in hypervisor MSR MSR0 is clear. Control logic 40 sets field n in hypervisor MSR MSR0 and generates an interrupt that is handled at the hypervisor privilege level. The hypervisor can then determine whether or not to set corresponding bit $H_n$ in hypervisor MSR MSR0 to enable the corresponding hardware facility, thereby granting access until bit $H_n$ is specifically cleared by the hypervisor.

Control logic 40 and supervisor MSR MSR1 implement similar functionality at a lower privilege level, such as the supervisor privilege level. A read or write of supervisor MSR MSR1 provides access bit flags $S_0$-$S_N$ each of which corresponds to the same hardware facility as corresponding bits $H_0$-$H_N$ in hypervisor MSR MSR0, but which are used to enable or disable hardware facilities for processes executing at a privilege level lower than the supervisor privilege level, generally by an application executing in the operating system image managed by the supervisor. In a manner similar to that described above with respect to hypervisor MSR MSR0, supervisor MSR MSR1, in conjunction with an interrupt by control logic 40 that has an interrupt handler that executes at the supervisor privilege level, provides an indication that that an application or other process executing at a privilege level equal to or lower than the supervisor privilege level has attempted to access disabled hardware facility n by control logic 40 setting field n in MSR MSR1 to a corresponding value and generating the interrupt. A write to MSR MSR1 sets or clears which individual bits $S_0$-$S_N$ are used to control the enabled/disabled state of the particular hardware facilities corresponding to the individual bits at the application level. The supervisor can then determine whether or not to set corresponding bit $S_n$ in supervisor MSR MSR1 to enable the corresponding hardware facility, thereby granting access until bit $S_n$ is specifically cleared by the supervisor, e.g., when the application that accessed the facility is terminated.

Figure 4:
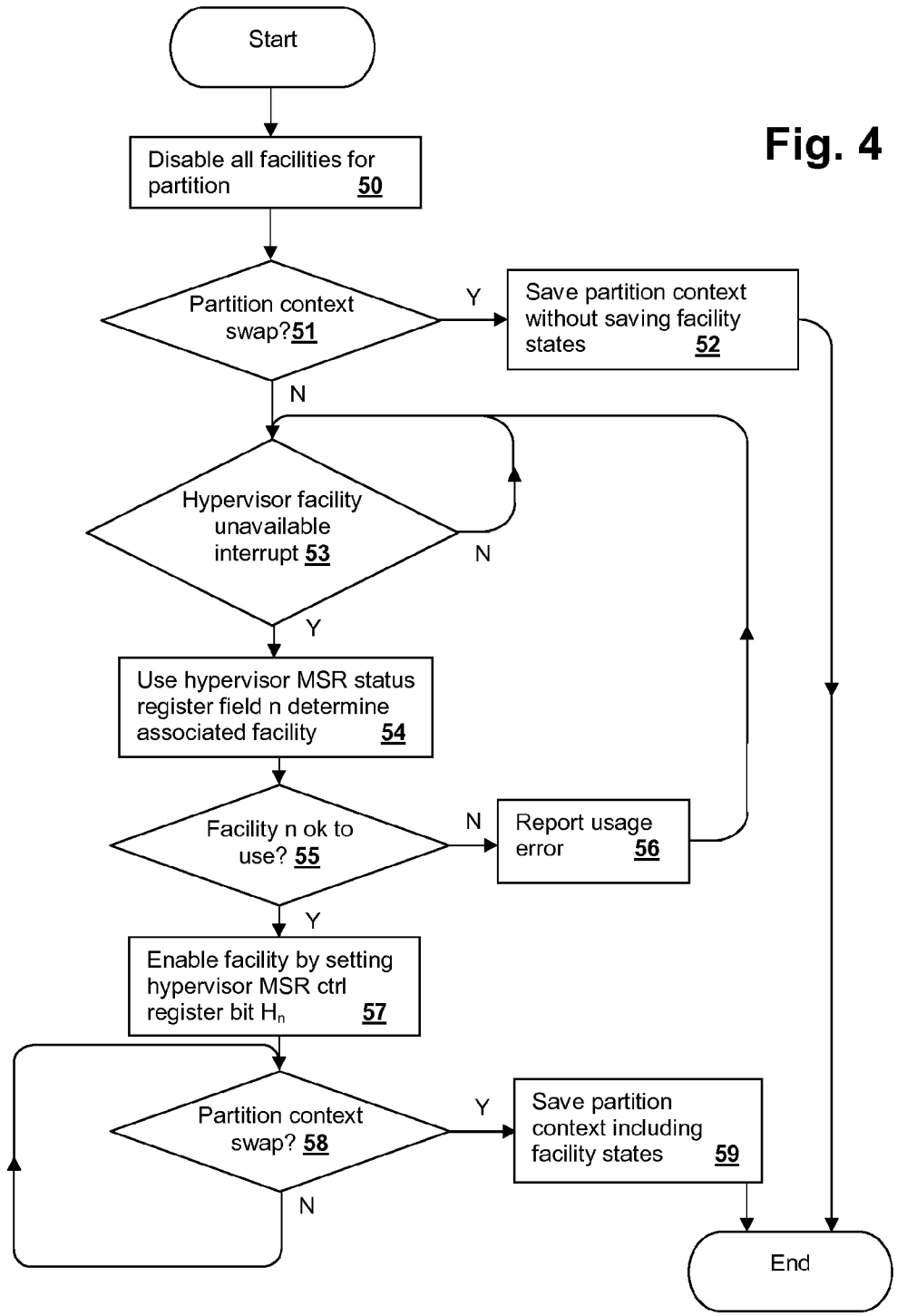
FIG. 4 is a flowchart depicting a method of performing a partition context swap in accordance with an embodiment of the present invention.

Referring now to FIG. 4, a method of managing partition swaps by a hypervisor in accordance with an embodiment of the present invention, is shown in a flowchart. By default, when a partition is loaded either at system initialization or partition context swap, all of bits $H_n$ in hypervisor MSR MSR0 are cleared (step 50). Supervisor MSR MSR1 should also be cleared, since the starting point for tracking facility use is with all facilities disabled at each privilege level. If a partition context swap occurs (decision 51) before any hypervisor facility unavailable interrupts have occurred (decision 53), then the partition context can be saved without saving the states of any of the hardware facilities (step 52). When a hypervisor facility unavailable interrupt occurs (decision 53), hypervisor MSR MSR0 is read to determine which facility n has been accessed by reading field n (step 54). If it is acceptable for the facility to be used by the requester, e.g., if the facility is typically available for use by the supervisor or the supervisor has requested use of the facility (decision 55), then the facility is enabled by setting the corresponding hypervisor MSR bit $H_n$. Otherwise, a facility usage error is reported (step 56). When a partition context swap occurs (decision 58), then the partition context is saved including any facility states for which the corresponding hypervisor MSR bit $H_n$ is set.

When a partition state is restored on a context swap, the hypervisor determines whether the stored context contains a state for each of the facilities and if the state is present, the hypervisor restores the state and sets the corresponding flags in the hypervisor control MSR. Alternatively, the hypervisor can restore the partition without restoring the stored context, and delay restoring the facility states along with setting the corresponding flags to enable the facility until the hypervisor receives notification that the facility is being accessed. The above-described alternative has the advantage of avoiding any need to restore the state of the facility if a subsequent context swap occurs before the facility is used. Similarly, when the supervisor restores an application context at an application context switch, the supervisor examines the context and determines whether the stored context contains a state for any of the facilities. If facility state(s) are present, the supervisor restores the state(s), and sets the corresponding bit(s) in the supervisor control MSR. Alternatively, the supervisor can restore the context without restoring the stored state(s) and delay restoring the state(s) and setting the corresponding flags to enable a corresponding facility until the supervisor receives a notification that a facility is being used by the application. The above-described embodiment has the advantage of avoiding any need to restore a state of a facility if a subsequent application context swap occurs before the facility has been accessed by the application.

Referring now to FIG. 5, a optional method of managing accesses to hardware facilities in accordance with an embodiment of the present invention, is illustrated in a flowchart. The illustrated method might be applicable, for example, when a process at a higher privilege level requires exclusive access to a facility without imposing the overhead of responding to notifications of attempted use by a lower level facility. If the process at the higher privilege level does not need to use the facility, the scheme described above with reference to FIG. 4 can be used to track usage of a facility by processes at a lower privilege levels and to determine whether it is needed to save or restore the context of the facility. As illustrated in FIG. 5, when a facility is requested from the hypervisor (step 70), if the usage is denied (decision 71), the request is pended until later (step 72), e.g., the supervisor must wait until the hypervisor has finished using the facility. If the usage is granted (decision 71), then the facility is used (step 73). When an application requests use of the facility (decision 74), if the facility is in-use (decision 75), then the request is denied (step 76), otherwise the request is granted and the corresponding bit $S_n$ is set in the supervisor control MSR (step 77).

As noted above, portions of the present invention may be embodied in a computer program product, which may include firmware, an image in system memory or another memory/cache, or stored on a fixed or re-writable media such as an optical disc having computer-readable code stored thereon. Any combination of one or more computer readable medium(s) may store a program in accordance with an embodiment of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of the present application, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A processing system, comprising:
   a memory for storing program instructions and data values; and
   a processor coupled to the memory for executing the program instructions to operate on the data values, wherein the processor comprises one or more hardware facilities including execution units for executing the program instructions, an instruction fetch unit for fetching the program instructions, an instruction dispatch unit for dispatching the program instructions to the execution units, a first machine state register containing a first plurality of flags for indicating to a process executed at a first privilege level that corresponding ones of the hardware facilities are in use by a process executing at another privilege level at or below the first privilege level, and a second machine state register containing a second plurality of flags for indicating to a process executed at a second privilege level below the first privilege level that corresponding ones of the hardware facilities are in use by a process executing at a third privilege level lower than that of the second privilege level.

2. The processing system of claim 1, further comprising:
   program instructions, that, when executed by the processor at the first privilege level, maintain a first hardware flag in the first machine state register of the processor to indicate whether or not the process executing at the another privilege level has accessed the corresponding particular hardware facility; and
   program instructions, that, when executed by the processor at the second privilege level, maintain a second hardware flag in the second machine state register of the processor that indicates whether or not a process executing at the third privilege level has accessed the corresponding particular hardware facility.

3. The processing system of claim 2, wherein the first privilege level is a hypervisor privilege level and wherein the second privilege level is a supervisory privilege level.

4. The processing system of claim 3, further comprising:
   program instructions that, when executed at the hypervisor privilege level and by a hypervisor, initiate a context swap of the partition;
   program instructions that, when executed at the hypervisor privilege level, determine whether or not to store a state of the particular hardware facility for the partition from an indication of whether the hypervisor has set the first hardware flag;
   program instructions that, when executed at the supervisor privilege level and by a supervisor, initiating a context swap of the application; and
   program instructions that, when executed at the supervisor privilege level, determine whether or not to store a state of the particular hardware facility for the application from an indication of whether the supervisor has set the second hardware flag.

5. The processing system of claim 2, further comprising:
   program instructions, that when executed at the hypervisor privilege level, clear the first machine status register to indicate that a plurality of hardware facilities including the particular hardware facility are disabled for access at the another privilege level;
   program instructions, that when executed at the hypervisor privilege level, receive a first indication that a given one of the plurality of hardware facilities has been accessed at the another privilege level;
   program instructions, that when executed at the hypervisor privilege level, determine from the first indication that the given hardware facility is the particular hardware facility; and
   program instructions, that when executed at the hypervisor privilege level, set the first hardware flag to enable access to the particular hardware facility at the another privilege level.

6. The processing system of claim 5, further comprising:
   program instructions, that when executed at the supervisor privilege level, clear the second machine status register to indicate that a plurality of hardware facilities including the particular hardware facility are disabled for access at the third privilege level;
   program instructions, that when executed at the supervisor privilege level, receive a second indication that the given hardware facility has been accessed at the third privilege level;
   program instructions, that when executed at the supervisor privilege level, determine from the second indication that the given hardware facility is the particular hardware facility; and
   program instructions, that when executed at the supervisor privilege level, set the second hardware flag to enable access to the particular hardware facility at the third privilege level.

7. The processing system of claim 6, wherein the first indication is a hypervisor interrupt, wherein the particular hardware facility is indicated in conjunction with the hypervisor interrupt by a first field within a first status register of the processor core, and wherein the second indication is a supervisor interrupt, wherein the particular hardware facility is indicated in conjunction with the supervisor interrupt by a second field within a second status register of the processor core.

8. A processor core, comprising:
   one or more hardware facilities including execution units for executing instructions;
   an instruction fetch unit for fetching the instructions;
   an instruction dispatch unit for dispatching the instructions to the execution units; and
   a first machine state register containing a first plurality of flags for indicating to a process executed at a first privilege level that corresponding ones of the hardware facilities are in use by a process executing at another privilege level below the first privilege level; and a second machine state register containing a second plurality of flags for indicating to a process executed at a second privilege level below the first privilege level that corresponding ones of the hardware facilities are in use by a process executing at a third privilege level lower than that of the second privilege level.

9. The processor core of claim 8, further comprising a control logic that generates a first interrupt at the first privilege level when a particular one of the hardware facilities is accessed and the corresponding flag in the first machine state register is not set.

10. The processor core of claim 9, wherein the control logic further generates a second interrupt at the second privilege level when the particular one of the hardware facilities is accessed and the corresponding flag in the second machine state register is not set.

11. A computer program product comprising a computer-readable storage medium storing program instructions for execution by a general-purpose computer system, wherein the program instructions are program instructions for managing access to hardware facilities within a processor core, wherein the program instructions comprise:

program instructions, that, when executed by the computer system at the first privilege level, maintain a first hardware flag in the first machine state register of the processor to indicate whether or not the process executing at the another privilege level has accessed the corresponding particular hardware facility; and program instructions, that, when executed by the computer system at the second privilege level, maintain a second hardware flag in the second machine state register of the processor that indicates whether or not a process executing at the third privilege level has accessed the corresponding particular hardware facility.

12. The computer program product of claim 11, wherein the first privilege level is a hypervisor privilege level, and wherein the second privilege level is a supervisor privilege level.

13. The computer program product of claim 12, further comprising:

program instructions, that when executed at the hypervisor privilege level, clear the first machine status register to indicate that a plurality of hardware facilities including the particular hardware facility are disabled for access at the another privilege level;

program instructions, that when executed at the hypervisor privilege level, receive a first indication that a given one of the plurality of hardware facilities has been accessed at the another privilege level;

program instructions, that when executed at the hypervisor privilege level, determine from the first indication that the given hardware facility is the particular hardware facility; and program instructions, that when executed at the hypervisor privilege level, set the first hardware flag to enable access to the particular hardware facility at the another privilege level.

14. The computer program product of claim 13, further comprising:

program instructions, that when executed at the supervisor privilege level, clear the second machine status register to indicate that a plurality of hardware facilities including the particular hardware facility are disabled for access at the third privilege level;

program instructions, that when executed at the supervisor privilege level, receive a second indication that the given hardware facility has been accessed at the third privilege level;

program instructions, that when executed at the supervisor privilege level, determine from the second indication that the given hardware facility is the particular hardware facility; and program instructions, that when executed at the supervisor privilege level, set the second hardware flag to enable access to the particular hardware facility at the third privilege level.

15. The computer program product of claim 12, further comprising:

program instructions that, when executed at the hypervisor privilege level and by a hypervisor, initiate a context swap of the partition;

program instructions that, when executed at the hypervisor privilege level, determine whether or not to store a state of the particular hardware facility for the partition from an indication of whether the hypervisor has set the first hardware flag;

program instructions that, when executed at the supervisor privilege level and by a supervisor, initiating a context swap of the application; and program instructions that, when executed at the supervisor privilege level, determine whether or not to store a state of the particular hardware facility for the application from an indication of whether the supervisor has set the second hardware flag.

\* \* \* \* \*